United States Patent
Peri et al.

(10) Patent No.: US 11,301,967 B2
(45) Date of Patent: Apr. 12, 2022

(54) INTELLIGENCE-BASED EDITING AND CURATING OF IMAGES

(71) Applicant: Samsung Electronics Company, Ltd., Suwon-si (KR)

(72) Inventors: Christopher A. Peri, Mountain View, CA (US); Euisuk Chung, Cupertino, CA (US); Yingen Xiong, Mountain View, CA (US); Lu Luo, Sunnyvale, CA (US)

(73) Assignee: SAMSUNG ELECTRONICS COMPANY, LTD., Suwon (KR)

( * ) Notice: Subject to any disclaimer, the term of this patent is extended or adjusted under 35 U.S.C. 154(b) by 79 days.

(21) Appl. No.: 16/933,860

(22) Filed: Jul. 20, 2020

(65) Prior Publication Data
US 2021/0065338 A1  Mar. 4, 2021

Related U.S. Application Data

(60) Provisional application No. 62/892,337, filed on Aug. 27, 2019.

(51) Int. Cl.
| | |
|---|---|
| *G06T 5/00* | (2006.01) |
| *G06K 9/00* | (2006.01) |
| *G06T 5/20* | (2006.01) |
| *G06K 9/62* | (2006.01) |

(52) U.S. Cl.
CPC .......... *G06T 5/005* (2013.01); *G06K 9/00664* (2013.01); *G06K 9/6267* (2013.01); *G06T 5/20* (2013.01); *G06T 2207/20032* (2013.01); *G06T 2207/20101* (2013.01)

(58) Field of Classification Search
CPC . G06T 5/005; G06T 5/20; G06T 2207/20032; G06T 2207/20101; G06K 9/00664; G06K 9/6267

See application file for complete search history.

(56) References Cited

U.S. PATENT DOCUMENTS

| | | | |
|---|---|---|---|
| 7,970,235 B1 * | 6/2011 | Bergman | G06T 5/005 382/275 |
| 8,023,766 B1 * | 9/2011 | Bergman | G06T 5/005 382/275 |
| 8,885,890 B2 | 11/2014 | Tardif | |
| 9,331,531 B2 | 5/2016 | Nadeau | |
| 9,479,709 B2 | 10/2016 | Bokari | |
| 9,569,825 B2 | 2/2017 | Yamada | |

(Continued)

*Primary Examiner* — Utpal D Shah
(74) *Attorney, Agent, or Firm* — Baker Botts L.L.P.

(57) ABSTRACT

A method implemented by a client device includes accessing a plurality of image frames captured by one or more cameras of the client device and generating a working image frame based at least in part on one or more of the plurality of image frames. The method further includes classifying one or more first objects detected in the working image frame based at least in part on a determined desirability of the one or more first objects. The one or more first objects are determined to be undesirable. The method further includes applying a pixel filtering process to the working image frame to replace one or more first pixel sets associated with the first objects with pixels from one or more image frames of the plurality of image frames to generate a final image frame, and displaying the final image frame on a display of the client device.

20 Claims, 10 Drawing Sheets

(56) References Cited

U.S. PATENT DOCUMENTS

| | | | |
|---|---|---|---|
| 11,100,335 B2* | 8/2021 | Winter | H04N 7/183 |
| 11,145,081 B2* | 10/2021 | Yang | G06K 9/6267 |
| 2005/0123183 A1* | 6/2005 | Schleyer | G06T 11/005 |
| | | | 382/131 |
| 2008/0027591 A1* | 1/2008 | Lenser | G05D 1/0251 |
| | | | 701/2 |
| 2009/0297039 A1 | 12/2009 | Reinpoldt, III | |
| 2016/0125633 A1* | 5/2016 | Windmark | H04N 5/2625 |
| | | | 382/103 |
| 2018/0188045 A1* | 7/2018 | Wheeler | G06K 9/6267 |
| 2019/0236786 A1* | 8/2019 | McNerney | G06K 9/6267 |
| 2019/0392596 A1* | 12/2019 | Yang | G06T 5/005 |

* cited by examiner

INTELLIGENCE-BASED EDITING AND CURATING OF IMAGES

PRIORITY

This application claims the benefit under 35 U.S.C. § 119(e) of U.S. Provisional Patent Application No. 62/892,337, filed 27 Aug. 2019, which is incorporated herein by reference.

TECHNICAL FIELD

This disclosure relates generally to captured images, and, more particularly, to the intelligence-based editing and curating of captured images.

BACKGROUND

With the ever-growing popularity of social media applications and other similar applications that allow users to readily share, stream, or store captured images and videos in, for example, social contexts, effective techniques or applications for ensuring the best possible rendering and presentation of such images and videos are becoming increasingly imperative for user electronic devices and interfaces. For example, users may typically capture many images while, for example, attending a vacation or celebrating a special occasion. As these captured images may be of particular importance to the user, the user may, for example, wish to make one or more edits to the captured images before sharing or storing the captured images. For instance, the user may apply a cropping or autocropping application to remove unwanted objects (e.g., other tourists, taxis, and so forth) that may have been captured inadvertently. However, such applications may often lead to the user deleting or cropping out more picture information than desired, or expending an inordinate amount of time manually editing dozens of captured images. It may be thus useful to provide techniques for improving image editing and curation.

DESCRIPTION OF EXAMPLE EMBODIMENTS

Figure 1:
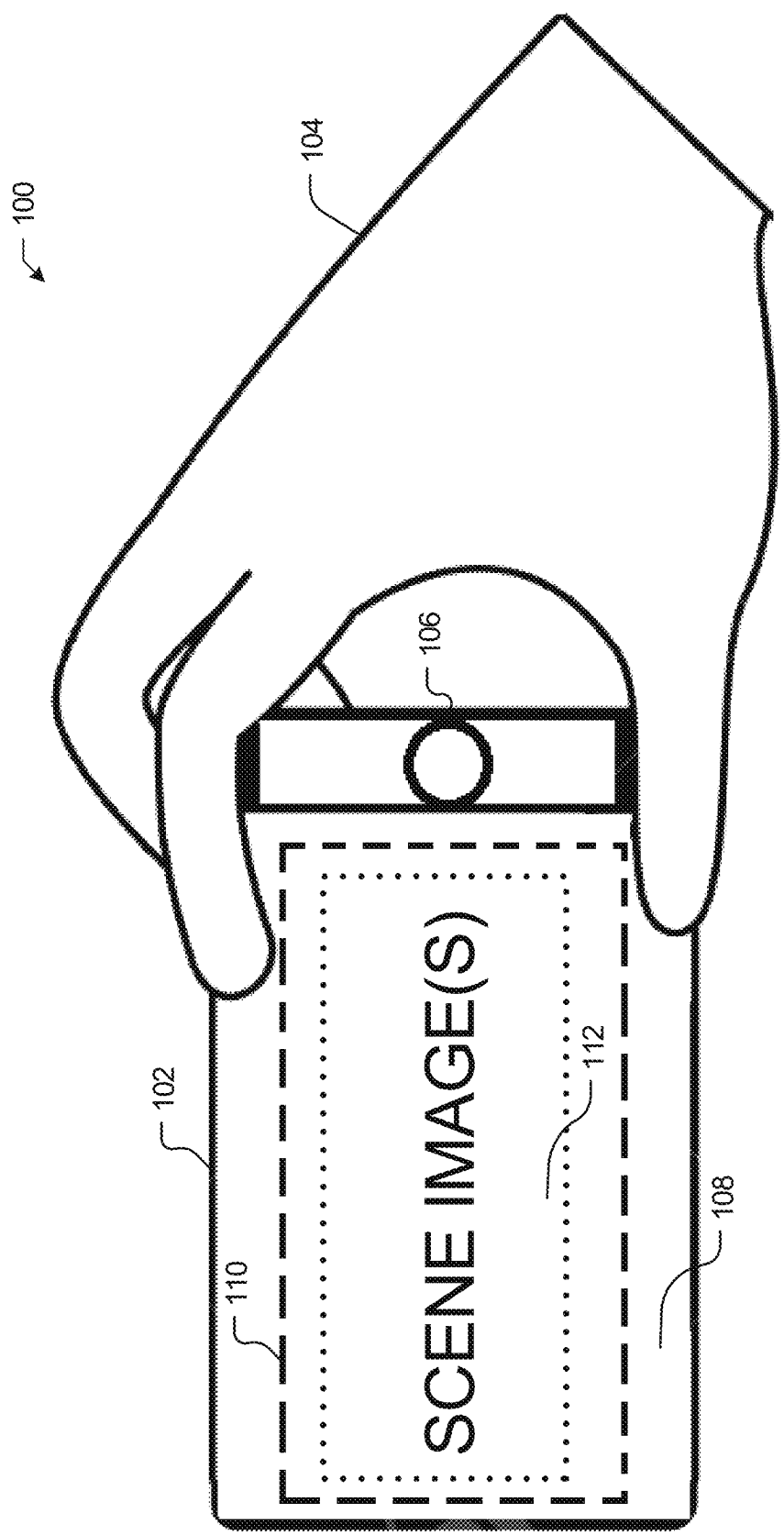
FIG. 1 illustrates an example image capturing device and intelligence-based editing and curating user interface (UI) architecture.

The present embodiments are directed toward an electronic device and user interface (UI) for performing a real-time or near real-time intelligence-based editing and curating of image frames. In particular embodiments, the electronic device may access a plurality of image frames captured by one or more cameras of the electronic device. For example, in particular embodiments, the electronic device may capture in real-time or near real-time a number of images (e.g., still images, near-still images, video images, panoramic images, multi-portrait images, and so forth) and/or access a number of previously captured images that may be stored on the electronic device. The electronic device may then generate a working image frame based on one or more of the plurality of image frames. For example, in particular embodiments, the electronic device may select a baseline image from the number of captured and/or stored images, for example, to be edited and curated.

In particular embodiments, the electronic device may then identify or classify one or more first objects detected in the working image frame based on a determined desirability of the one or more first objects. For example, in particular embodiments, the electronic device may perform, for example, object recognition and classification to identified or classify image objects as being either dynamic image objects (e.g., persons, pets, clouds, water waves, flying flags, birds, moving vehicles, and so forth) or static image objects (e.g., buildings, signs, structures, sculptures, parked vehicles, trees, mountains, and so forth). In particular embodiments, the image objects detected and classified as being dynamic image objects may be determined to be desirable and/or undesirable based on, for example, one or more user inputs and/or one or more predetermined rules defined by the user, for example. Similarly, the image objects identified or classified as being static image objects may be determined to be desirable based on, for example, one or more user inputs and/or one or more predetermined rules defined by the user, for example. In particular embodiments, only some of the image objects (e.g., persons, pets, moving vehicles) detected and classified as being dynamic image objects may be determined to be undesirable, while other image objects (e.g., clouds, water waves, flying flags, birds, moving vehicles, one or more particular persons, and so forth) detected and classified as being dynamic image objects may be determined to be desirable based on, for example, one or more predetermined rules.

In particular embodiments, the electronic device may then apply a pixel filtering process to the working image frame to replace one or more first pixel sets associated with the one or more first objects with pixels from one or more image frames of the number of images to generate a final image frame. For example, in particular embodiments, the electronic device may perform, for example, one or more pixel averaging algorithms, pixel mean averaging algorithms, pixel median filtering algorithms, pixel appearance filtering algorithms (e.g., pixel maximum likelihood appearance filtering algorithms), or pixel general filtering algorithms to generate a final image that includes only desirable image objects and is absent all of the undesirable image objects. Indeed, in particular embodiments, the pixels corresponding to the static image objects and a subset of the pixels corresponding to the dynamic image objects (e.g., corresponding to only the dynamic image objects determined to be desirable) may be subject to a pixel-locking and/or sampled over a number of image frames and utilized to construct a final image by removing all but only a subset of the pixels corresponding to the dynamic image objects (e.g., the subset of pixels corresponding to the subset of dynamic image objects determined to be undesirable) and replacing those pixels with one or more pixels corresponding to the static image objects.

In particular embodiments, one or more pixels corresponding to static image objects (e.g., image objects determined to be desirable, such as buildings, signs, structures, sculptures, parked vehicles, trees, mountains, and so forth) may be partially occluded by pixels corresponding to undesirable dynamic image objects. In such a case, the electronic device may keep track of the corresponding pixel locations as additional images are captured and utilize sampled pixels (e.g., pixel values) from other frames corresponding to the particular locations of the partially occluded static image objects to reconstruct the partially occluded static image objects, so as to render the full and complete form of the desirable static image objects in the final image.

In particular embodiments, the electronic device may then display the final image frame on a display of the electronic device. For example, the electronic device may display via the display and UI a final edited and curated image generated according to the desire of the user to be viewed by the user and/or stored on the electronic device for future viewing or user interaction. Accordingly, the present embodiments may provide an electronic device and associated UI for performing a real-time or near real-time intelligence-based editing and curating of captured image frames. In this way, the electronic device may perform various intelligence-based editing and curating of captured images independently of onerous user input and supervision. Instead, the user may simply indicate desirability and/or undesirability for certain image objects, and as the user captures or accesses images, the electronic device may independently edit and curate the images to remove undesirable image objects and to emphasize desirable image objects. Furthermore, as the present techniques may allow users to remove pixels corresponding to undesirable image objects of captured images and replace those pixels with pixels corresponding to only desirable image objects of the captured image (e.g., so as to render the desirable image objects in their complete form absent the undesirable image objects), the bit depth and dynamic range of the captured images may be reduced in many instances, and, by extension, the impact to memory capacity and power consumption of the electronic device may also be reduced.

FIG. 1 illustrates an example image capturing device and intelligence-based editing and curating user interface (UI) architecture 100. As depicted, an electronic device 102 that may be utilized by a user 104 to, for example, capture images (e.g., still images, near-still images, video images, panoramic images, multi-portrait images, and so forth) and perform a real-time or near real-time intelligence-based editing and curating of the captured images, in accordance with the presently disclosed embodiments. In particular embodiments, the electronic device 102 may include, for example, a mobile electronic device (e.g., a mobile phone, a tablet computer, a laptop computer, a standalone camera, or other electronic device that may be capable of capturing images) that the user 104 may carry in hand and utilize to capture scene images 112, for example. In another embodiment, the electronic device 102 may include, for example, a wearable electronic device (e.g., a watch, a head-mounted display (HMD), eyeglasses, goggles, contact lenses, a wristband, and so forth) that the user 104 may wear, for example, as the electronic device 102 captures scene images 112. In particular embodiments, the electronic device 102 may include a mobile electronic device that may include, for example, one or more front-facing or rear-facing cameras for capturing scene images 112 (e.g., one or more images of a real-world scene).

In particular embodiments, as further depicted by FIG. 1, the electronic device 102 may include an input mechanism 106 that may include, for example, any physical structures utilized to control one or more global functions of the electronic device 102 (e.g., pressing a button to power "ON" or power "OFF" or to launch one or more user interface (UIs) 110 on the electronic device 102). In particular embodiments, as further illustrated, the electronic device 102 may include a display 108 on which the user 104 may view and/or interact with, for example, images being captured by the electronic device 102 and/or images previously captured and accessed from storage of the electronic device 102. In particular embodiments, the electronic device 102 may also include a UI 110 that may be launched on the display 108, and utilized to, for example, perform a real-time or near real-time intelligence-based editing and curating of captured scene images 112 (e.g., one or more images of a real-world scene), in accordance with the presently disclosed embodiments.

Figure 2A:
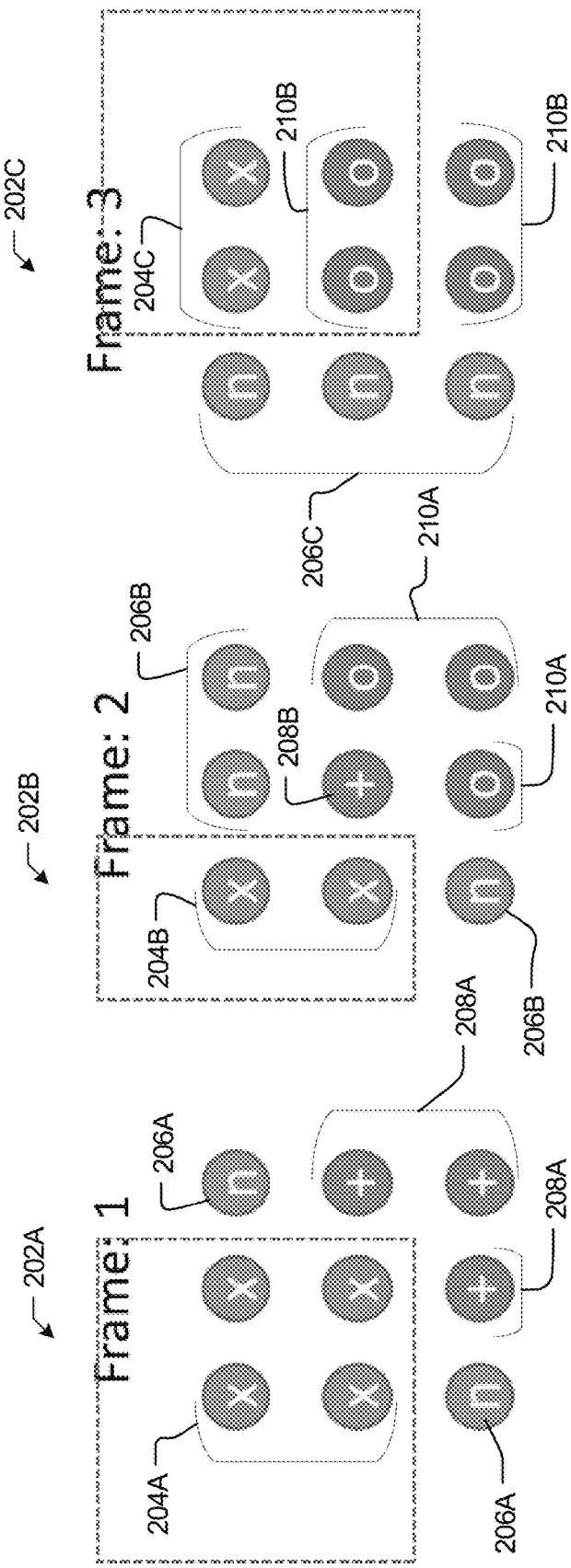
FIG. 2A illustrates a diagram pixel layout of an image including classifications for three respective image frames.

FIG. 2A illustrates a pixel layout diagram 200 of an image including identifications or classifications for three respective image frames 202A (e.g., "Frame 1"), 202B (e.g., "Frame 2"), and 202C (e.g., "Frame 3"). Specifically, the respective image frames 202A (e.g., "Frame 1"), 202B (e.g., "Frame 2"), and 202C (e.g., "Frame 3") may correspond to one or more image captured scene images 112 captured, for example, in series by the electronic device 102. For example, referring to the respective image frames 202A (e.g., "Frame 1"), 202B (e.g., "Frame 2"), and 202C (e.g., "Frame 3"), the electronic device 102 may analyze all of the pixels to identify or classify image objects as being either dynamic image objects (e.g., persons, pets, clouds, water waves, flying flags, birds, moving vehicles, and so forth) or static image objects (e.g., buildings, signs, structures, sculptures, parked vehicles, trees, mountains, and so forth) and to determine one or more actions to be performed on the corresponding pixels in response thereto. In particular embodiments, the electronic device 102 may determine by default that the pixels corresponding to the dynamic image objects (e.g., persons, pets, clouds, water waves, flying flags, birds, moving vehicles, and so forth) are to be removed, while the pixels corresponding to the static image objects (e.g., buildings, signs, structures, sculptures, parked vehicles, trees, mountains, and so forth) are to be preserved (e.g., via pixel-locking) in the final edited and curated image. In particular embodiments, the electronic device 102 may make determinations as to which pixels to remove or preserve (e.g., via pixel-locking) based on, for example, one or predetermined rules defined by the user 104, irrespective of whether the pixels correspond to dynamic image objects or static image objects.

Specifically, the electronic device 102 may maintain a matrix, an array, a pixel value histogram, or other record of the status of all of the pixels as successive image frames 202A (e.g., "Frame 1"), 202B (e.g., "Frame 2"), and 202C (e.g., "Frame 3") are captured, and then the image objects are identified or classified with the corresponding pixels being designated accordingly. For example, in particular embodiments, the electronic device 102 may utilize, for example, one or more convolutional neural networks (CNNs), recurrent neural networks (RNNs), long short term memory (LSTM), or other deep learning and computer vision algorithms to identify or classify the image objects and record, for example, a block of pixels corresponding to the coordinates of the image objects in the respective image frames 202A (e.g., "Frame 1"), 202B (e.g., "Frame 2"), and 202C (e.g., "Frame 3") or one or more specific silhouettes of the pixels corresponding to the coordinates of the image objects in the respective image frames 202A (e.g., "Frame 1"), 202B (e.g., "Frame 2"), and 202C (e.g., "Frame 3").

In particular embodiments, as further depicted in FIG. 2A, the pixels 204A, 204B, and 204C may be identified or classified as pixels corresponding to dynamic image objects (e.g., persons, pets, clouds, water waves, flying flags, birds, moving vehicles, and so forth). Thus, in particular embodiments, the electronic device 102 may determine the pixels 204A, 204B, and 204C to be pixels that are to be removed (e.g., pixels corresponding to dynamic image objects determined to be undesirable by default or automatically) from the respective image frames 202A (e.g., "Frame 1"), 202B (e.g., "Frame 2"), and 202C (e.g., "Frame 3") utilizing one or more pixel averaging algorithms, pixel mean averaging algorithms, pixel median filtering algorithms, pixel appearance filtering algorithms (e.g., pixel maximum likelihood appearance filtering algorithms), or pixel general filtering algorithms. In particular embodiments, a subset of the pixels 204A, 204B, and 204C corresponding to the dynamic image objects (e.g., corresponding to only the dynamic image objects the user 104 may indicate as being desirable) may be subject to a pixel-locking to be included in the final edited and curated image frame. In one embodiment, the values of all of the pixels that are subject to a pixel-locking may be recorded into a matrix or table to be later applied in the construction of the final edited and curated image frame.

In particular embodiments, in such a case or potential case, the electronic device 102 may thus determine the pixels 206A, 206B, and 206C (e.g., neighboring pixels to the pixels 204A, 204B, and 204C corresponding to the dynamic image objects) to be sampled for performing, for example, one or more pixel averaging algorithms, pixel mean averaging algorithms, pixel median filtering algorithms, pixel appearance filtering algorithms (e.g., pixel maximum likelihood appearance filtering algorithms), or pixel general filtering algorithms to generate a final edited and curated image that includes one or more of the pixels 206A, 206B, and 206C (e.g., neighboring pixels to the pixels 204A, 204B, and 204C corresponding to the dynamic image objects) in place of the pixels 204A, 204B, and 204C corresponding to the dynamic image objects. For example, in particular embodiments, one or more of the pixels 206A, 206B, and 206C may be utilized to reconstruct one or more of the pixels 204A, 204B, and 204C corresponding to a subset of dynamic image objects (e.g., clouds, water waves, flying flags, birds, one or more particular persons, and so forth) determined to be desirable to be included in the final edited and curated image. As further depicted, the electronic device 102 may also identify or classify pixels 208A, 208B, and 208 as including, for example, background pixels that are to be automatically pixel-locked for preserving for the final edited and curated image.

In particular embodiments, as further depicted in FIG. 2A, the pixels 210A and 210B may be identified or classified as pixels corresponding to static image objects (e.g., buildings, signs, structures, sculptures, parked vehicles, trees, mountains, and so forth). Thus, in particular embodiments, the electronic device 102 may determine the pixels 210A and 210B to be pixels that are to be subject to a pixel-locking (e.g., pixels corresponding to desirable static image objects to be preserved for the generation of the final edited and curated image) and preserved in each of the respective image frames 202A (e.g., "Frame 1"), 202B (e.g., "Frame 2"), and 202C (e.g., "Frame 3"). The electronic device 102 may then utilize one or more pixel averaging algorithms, pixel mean averaging algorithms, pixel median filtering algorithms, pixel appearance filtering algorithms (e.g., pixel maximum likelihood appearance filtering algorithms), or pixel general filtering algorithms to generate one or more final edited and curated image frames.

In particular embodiments, the final edited and curated image frames may include, for example, only pixels determined to be desirable, such as the pixels 208A, 208B, and 208C (e.g., background pixels), the pixels 210A and 210B corresponding to the static image objects (e.g., buildings, signs, structures, sculptures, parked vehicles, trees, mountains, and so forth), one or more of the pixels 206A, 206B, and 206C (e.g., neighboring pixels to the pixels 204A, 204B, and 204C corresponding to the dynamic image objects), and possibly one or more of a subset of the pixels 204A, 204B, and 204C corresponding to the dynamic image objects (e.g., only one or more pixels corresponding to clouds, water waves, flying flags, birds, airplanes, one or more particular persons, and so forth) (e.g., corresponding to only the dynamic image objects determined to be desirable based on one or more predetermined rules. Specifically, the electronic device 102 may display via the display 108 and associated UI 110 a final edited and curated image generated according to the desire of the user 104 to be viewed by the user 104 and/or stored on the electronic device 102 for future viewing or user 104 interaction. Accordingly, the present embodiments may provide an electronic device 102 and associated UI 110 for performing a real-time or near real-time intelligence-based editing and curating of captured image frames.

In this way, the electronic device 102 may perform various intelligence-based editing and curating of captured images independently of onerous user 104 input and supervision. Instead, the user 104, for example, may simply indicate desirability and/or undesirability for certain image objects, and as the user 104 captures or accesses images, the electronic device 102 may independently edit and curate the images to remove undesirable image objects and to emphasize desirable image objects. Furthermore, as the present techniques may allow the user 104 to remove pixels corresponding to undesirable image objects of captured images and replace those pixels with pixels corresponding to only desirable image objects of the captured image (e.g., so as to render the desirable image objects in their complete form absent the undesirable image objects), the bit depth and dynamic range of the captured images may be reduced in many instances, and, by extension, the impact to memory capacity and power consumption of the electronic device 102 may also be reduced.

Figure 2B:
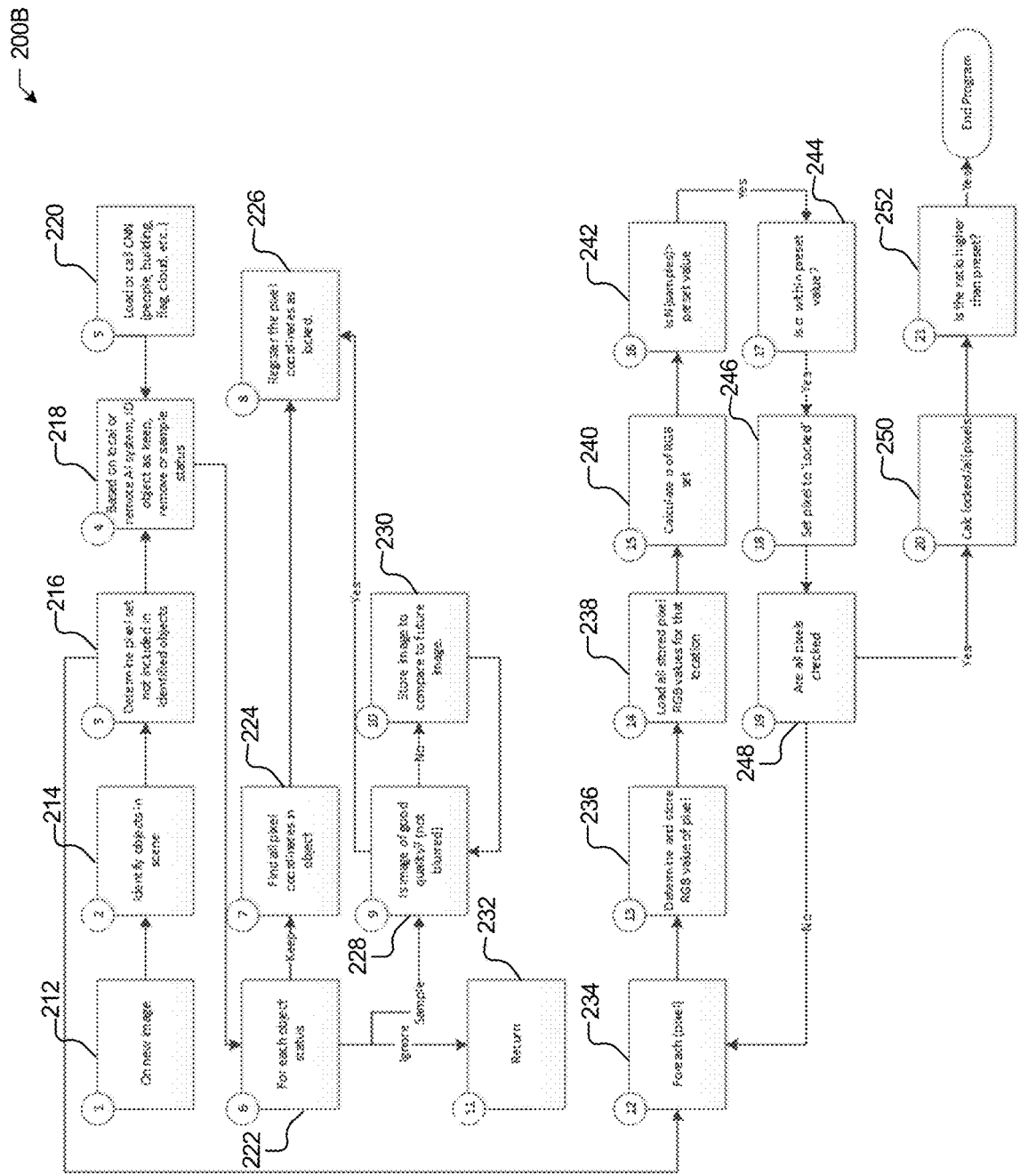
FIG. 2B illustrates a workflow diagram for performing a real-time or near real-time intelligence-based editing and curating of image frames.

FIG. 2B illustrates a workflow diagram 200B for performing a real-time or near real-time intelligence-based editing and curating of image frames. In particular embodiments, the workflow diagram 200B may correspond to, and be performed, for example, on the pixel layout diagram 200 as discussed above with respect to FIG. 2A. The workflow diagram 200B may begin at block 212 with a new captured scene image 112 being received by the UI 110 of the electronic device 102 (e.g., 1 image every 5 seconds). The workflow diagram 200B may then continue at block 214 with identifying or classifying objects in the captured scene image 112 by, for example, by utilizing one or more CNNs that may attempt to identify and return the pixel outline of objects including persons, for example. The workflow diagram 200B may then continue at block 216 with determining one or more pixel sets not included in identified objects. For example, in particular embodiments, once all objects in the captured scene image 112 has been identified and their coordinating pixel outlines are determined, any pixels that are not included in the pixel outlines of the identified objects may be considered "undefined." In particular embodiments, based on the identification or classification of one or more pixels or one or more sets of pixels (e.g., "preserve", "remove", and "sample"; and "undefined"), the workflow diagram 200B may proceed to block 218 with identifying objects to "preserve", "remove", "sample", or, on the other hand, the workflow diagram 200B may proceed to block 234 with performing pixel averaging process (e.g., on a pixel by pixel basis) of the pixels of the captured scene image 112 identified or classified as being "undefined".

In particular embodiments, for the one or more pixels or one or more sets of pixels being identified or classified to "preserve", "remove", and "sample", the workflow diagram 200B may then continue at block 218 with identifying or classifying which objects to "preserve", "remove", or "sample". For example, to identify objects to "preserve", "remove", or "sample" the workflow diagram 200B may include loading or calling at block 220 with one or more CNNs to identify or classify one or more objects of interests (e.g., persons, buildings, flags, clouds, and so forth). For example, one or more CNN libraries may be loaded from either the electronic device 102 or a cloud-based service in which the electronic device 102 may be registered. The workflow diagram 200B may then continue at block 222 with: 1) for each object identified or classified as "preserve": finding at block 224 all pixels coordinates in the object (e.g., pixel-locking all pixels that belong to this object) and with registering at block 226 the pixel coordinates as locked. For example, a database or other storage of the electronic device 102 may be updated to store these pixels as being pixel-locked. Returning to block 222, the workflow diagram 200B may continue with: 2) for each object identified or classified as "sample": determining at block 228 image quality (e.g., whether the pixels corresponding to objects identified or classified as "sample" are blurred or not). In particular embodiments, objects that are identified or classified as "sample", for example, may correspond to desirable moving objects, such as flags, clouds, tree limbs in the wind, water waves, birds, airplanes, and so forth. In particular embodiments, the image quality of the pixels corresponding to objects identified or classified as "sample" may be determined based on, for example, a determined sharpness of the captured scene image 112. In particular embodiments, if the pixels corresponding to objects identified or classified as "sample" are determined to be of acceptable quality, then these pixels may be pixel-locked (e.g., registering these pixel coordinates as locked at block 226). However, if the pixels corresponding to objects identified or classified as "sample" are determined to be of unacceptable quality, the workflow diagram 200B may then continue at block 230 with storing the particular captured scene image 112 as a benchmark image to compare to one or more future captured scene images 112. In particular embodiments, when a next captured scene image 112 is loaded, the benchmark image may be utilized to be compared to the next captured scene image 112. For example, whichever of these captured scene images 112 is of the greatest quality, that particular captured scene image 112 may be preserved. Returning again to block 222, the workflow diagram 200B may continue with: 3) for each object identified or classified as "remove": returning at block 230 to wait for a next captured scene image 112. For example, the pixels corresponding to objects identified or classified as "remove" may be simply marked for removal and the workflow diagram 200B may return to block 212 to wait for a next captured scene image 112.

In particular embodiments, the workflow diagram 200B may proceed from block 216 to block 234 with performing pixel averaging process (e.g., on a pixel by pixel basis) of the pixels of the captured scene image 112 identified or classified as being "undefined". In particular embodiments, the pixels of the captured scene image 112 identified or classified as being "undefined" may correspond to, for example, background pixels of the captured scene image 112. In particular embodiments, the workflow diagram 200B may then continue at block 236 with determining and storing the (R)ed, (B)lue, (G)reen color values for each pixel (e.g., on a pixel by pixel basis). The workflow diagram 200B may then continue at block 238 with loading all stored RGB values for a particular pixel location. The workflow diagram 200B may then continue at block 240 with calculating a sigma value for the RGB pixel value and at block 242 determining whether an N number of samples is greater than a preset value. If the N number of samples is determined to be greater than the preset value, the workflow diagram 200B may then continue at block 244 determining whether the sigma value is within the N number of samples of a preset value.

If the sigma value is determined to be within the N number of samples of the preset value, the workflow diagram 200B may then proceed to block 246 setting pixels of the pixels of the captured scene image 112 identified or classified as being "undefined" to be locked. In particular embodiments, the pixels of the captured scene image 112 identified or classified as being "undefined" may be set to be locked, for example, by calling one or more filters to perform pixel processing. For example, in particular embodiments, the UI 110 may retrieve pixel available history for replacement (e.g., on a pixel by pixel basis) and create a queue with the pixel value history. The size of the queue may depend on the length of the history which is predefined. The UI 110 may then sort the queue with pixel values and finds the index of the median of the queue. The pixel corresponding to the index may be a candidate for replacement. The UI 110 may then replace the current pixel value with a candidate pixel value. This may be performed until all pixels are processed. The workflow diagram 200B may then continue at block 248 with verifying whether all pixels of the captured scene image 112 identified or classified as being "undefined" have been checked (e.g., on a pixel by pixel basis). If all pixels of the captured scene image 112 identified or classified as being "undefined" are checked, the workflow diagram 200B may then conclude at block 250 with calculating a ratio of pixel-locked pixels to all pixels in the captured scene image 112 identified or classified as being "undefined" and determining whether the ratio the of pixel-locked pixels is greater the preset value. If all pixels of the captured scene image 112 identified or classified as being "undefined" are not checked, the workflow diagram 200B may return to block 234.

Figure 3:
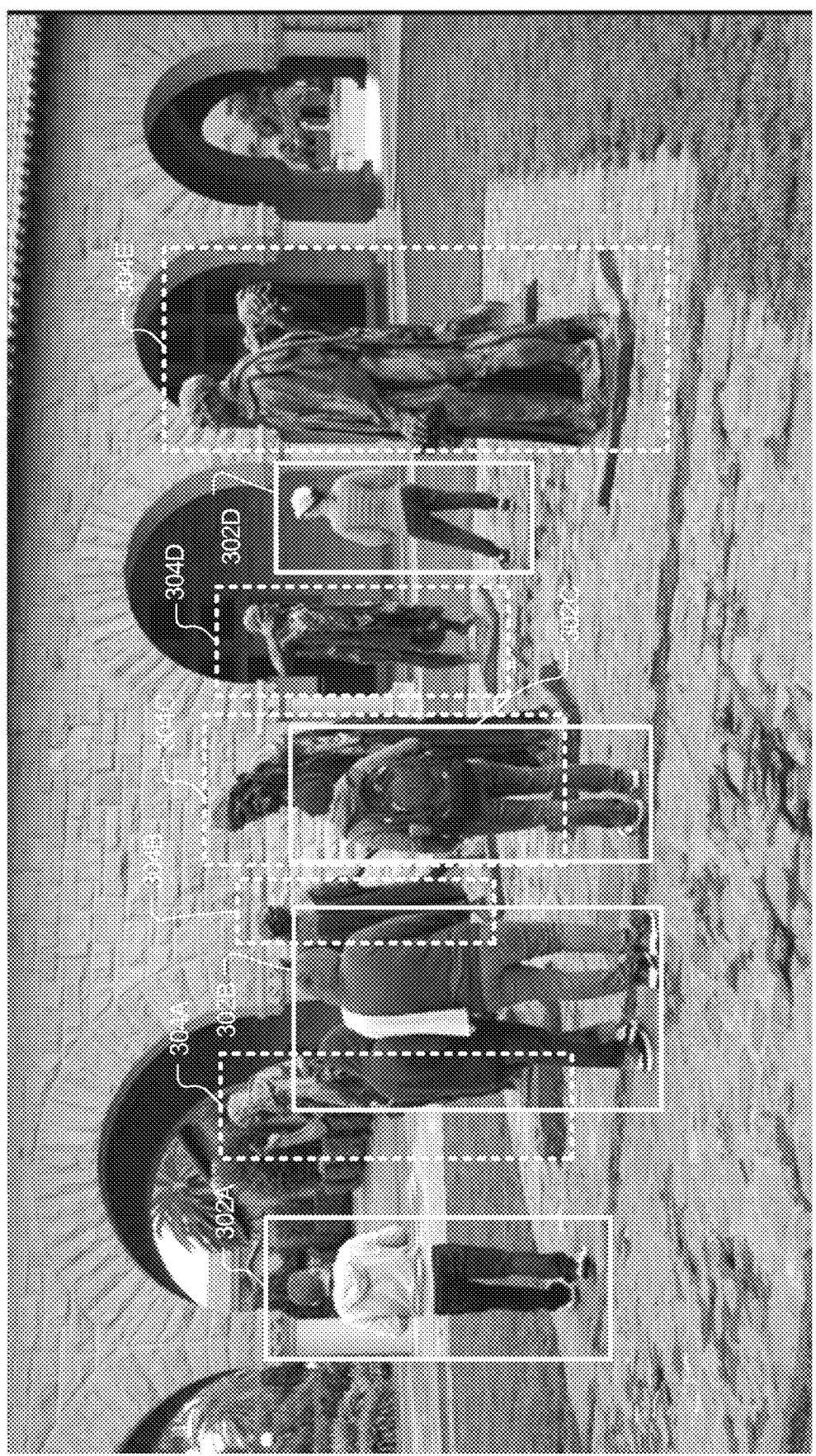
FIG. 3 depicts a working image frame.

FIG. 3 depicts a working image frame 300, illustrating an example of performing a real-time or near real-time intelligence-based editing and curating of captured images, in accordance with the presently disclosed embodiments. As depicted, the electronic device 102 may identify or classify a number of dynamic image objects 302A, 302B, 302C, and 302D (e.g., persons) over a number of captured image frames. As previously discussed above, all or many of the dynamic image objects 302A, 302B, 302C, and 302D (e.g., persons) may be determined to be undesirable, and thus the electronic device 102 may designate the pixels corresponding to the dynamic image objects 302A, 302B, 302C, and 302D (e.g., persons that may lack any association with the user 104) to be removed from the working image frame 300. As further depicted, the electronic device 102 may also identify or classify a number of static image objects 304A, 304B, 304C, and 304D (e.g., historic sculptures) over a number of captured image frames. The electronic device 102 may thus designate the pixels corresponding to the static image objects 304A, 304B, 304C, and 304D (e.g., historic sculptures) to be subject to a pixel-locking and preserved in the working image frame 300.

In particular embodiments, as further illustrated by the working image frame 300, pixels corresponding to one or more of the static image objects, such as specifically static image objects 304A, 304B, and 304C may be partially occluded by pixels corresponding to the undesirable dynamic image objects 302B and 302C, for example. In particular embodiments, each time the electronic device 102 may detect occluded desirable pixels such as the static image objects 304A, 304B, and 304C, the electronic device 102 may perform one or more confidence weighting algorithms to determine whether or not to automatically subject these occluded pixels to a pixel-locking, as for example, the user 104 captures successive image frames via the electronic device 102. In particular embodiments, the confidence weighting may be determined based on, for example, a user desirability scale for rendering the occluded pixels. For example, in such a case, the electronic device 102 may keep track of the corresponding pixel locations (e.g., pixel (x, y) coordinates) as additional image frames are captured and may utilize sampled pixels (e.g., pixels neighboring the dynamic image objects 302B and 302C, as well as other pixels specifically corresponding to the static image objects 304A, 304B, and 304C) from other image frames corresponding to the particular locations (e.g., corresponding to the pixel (x, y) coordinates) of the partially occluded static image objects 304A, 304B, and 304C to reconstruct the partially occluded static image objects 304A, 304B, and 304C, so as to render the full and complete form (e.g., without any undesirable pixel blurring, pixel distortion, pixel washout, or other undesirable image artifacts) of all of the desirable static image objects 304A, 304B, 304C, and 304D (e.g., historic sculptures) in the final image frame. Thus, the pixels neighboring the dynamic image objects 302B and 302C, as well as other pixels specifically corresponding to the static image objects 304A, 304B, and 304C may be utilized to replace the pixels corresponding to the undesirable dynamic image objects 302B and 302C.

Figure 4:
FIG. 4 depicts a final image frame.

FIG. 4 depicts a final image frame 400, illustrating a result of performing a real-time or near real-time intelligence-based editing and curating of captured images, in accordance with the presently disclosed embodiments. As depicted, the electronic device 102 utilizing, for example, one or more pixel averaging algorithms, pixel mean averaging algorithms, pixel median filtering algorithms, pixel appearance filtering algorithms (e.g., pixel maximum likelihood appearance filtering algorithms), or pixel general filtering algorithms may generate the final image frame 400 that includes all of the pixels corresponding to the desirable static image objects 304A, 304B, 304C, and 304D (e.g., historic sculptures) rendered in their full and complete form (e.g., without any undesirable pixel blurring, pixel distortion, pixel washout, or other undesirable image artifacts). The final image frame 400 also illustrates that one or more dynamic image objects 402A, 402B, and 402C (e.g., a particular person or other desirable dynamic image object that may be associated with the user 104) may be introduced into the final image frame 400, while all of the pixels corresponding to the undesirable dynamic image objects 302A, 302B, 302C, and 302D (e.g., persons that may lack any association with the user 104) may be removed.

Although FIG. 4 is intended to show the final image frame 400 resulting from the working image frame 300 of FIG. 3, it should be appreciated that, in particular embodiments, while the undesirable dynamic image objects 302A, 302B, 302C, and 302D are being removed and/or replaced, the UI 110 on the electronic device 102 may display one or more animations or indicators as the undesirable dynamic image objects 302A, 302B, 302C, and 302D are being removed and/or replaced. For example, in particular embodiments, the UI 110 on the electronic device 102 may display one or more animations that appear to show the undesirable dynamic image objects 302A, 302B, 302C, and 302D being erased (e.g., erased one image object at a time or erased all at once), disappeared instantaneously, disappeared gradually, faded out over some time period, transformed from one image object (e.g., dynamic image object 302D) to another image object (e.g., dynamic image object 402A), changed from one color to another color, and so forth. In other embodiments, the UI 110 on the electronic device 102 may display one or more indicators, such as a progress bar (e.g., illustrating a changing percentage value of the total pixels being removed and/or replaced), a timer (e.g., a countdown timer), one or more banners, one or more badges, or other similar indicators that may display to the user 104 the overall status of the final image frame editing and curation.

Figure 5:
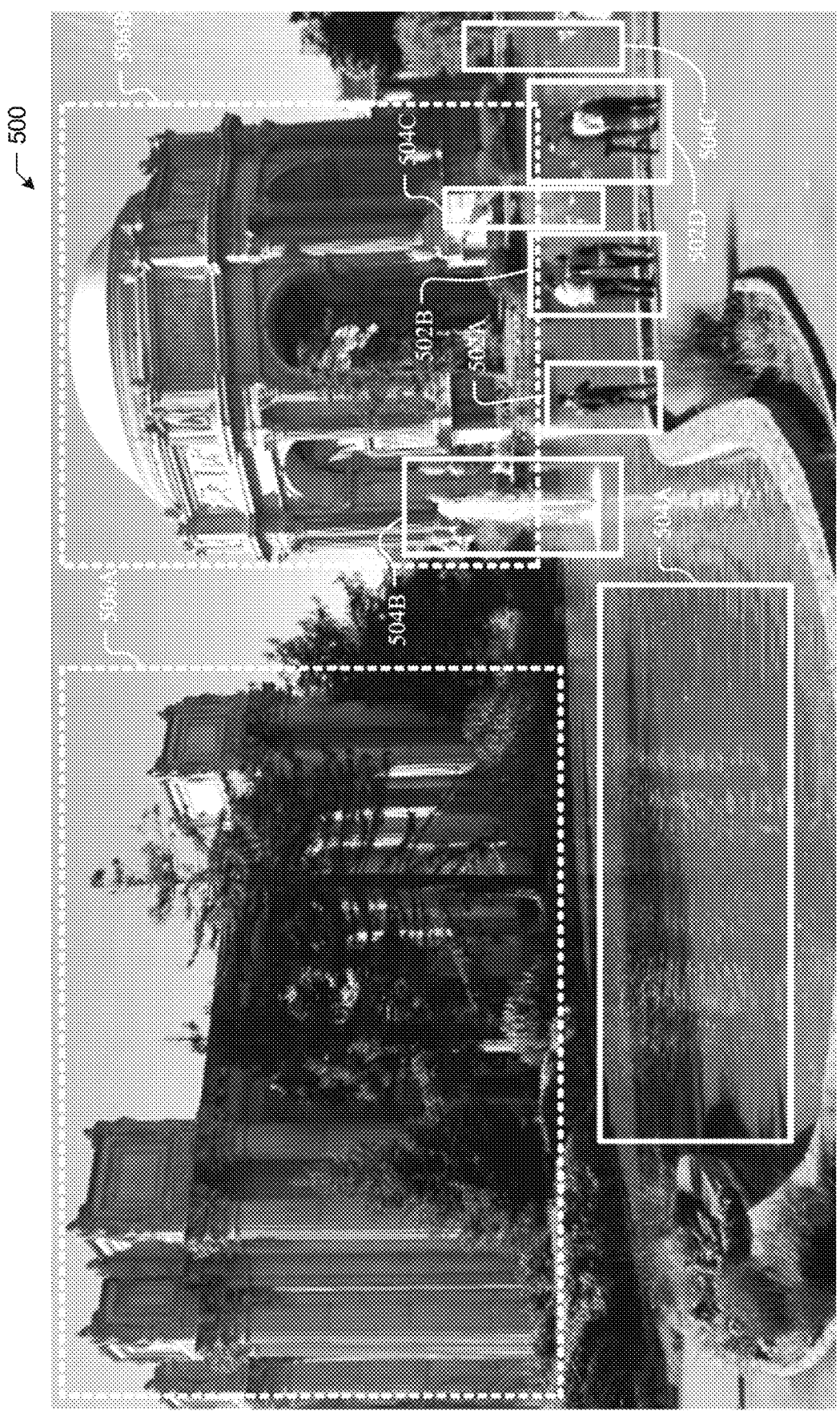
FIG. 5 depicts another working image frame.

FIG. 5 depicts another working image frame 500, illustrating an example of performing a real-time or near real-time intelligence-based editing and curating of captured images, in accordance with the presently disclosed embodiments. As depicted, the working image frame 500 illustrates a scene, which includes undesirable dynamic image objects 502A, 502B, 502C, and 502D (e.g., persons that may lack any association with the user 104) and desirable dynamic image objects 504A (e.g., water waves), 504B (e.g., water fountain), 504C (e.g., birds), and 504D (e.g., birds). The scene captured in the working image frame 500 also includes desirable static image objects 506A and 506B (e.g., buildings, trees). The electronic device 102 may designate the pixels corresponding to the undesirable dynamic image objects 502A, 502B, 502C, and 502D (e.g., persons) to be removed from the working image frame 500. On the other hand, the electronic device 102 may designate the pixels corresponding to the desirable dynamic image objects 504A (e.g., water waves), 504B (e.g., water fountain), 504C (e.g., birds), and 504D (e.g., birds) and the pixels corresponding to the desirable static image objects 506A and 506B (e.g., buildings, trees) to be subject to pixel-locking and preserved in the working image frame 500.

Figure 6:
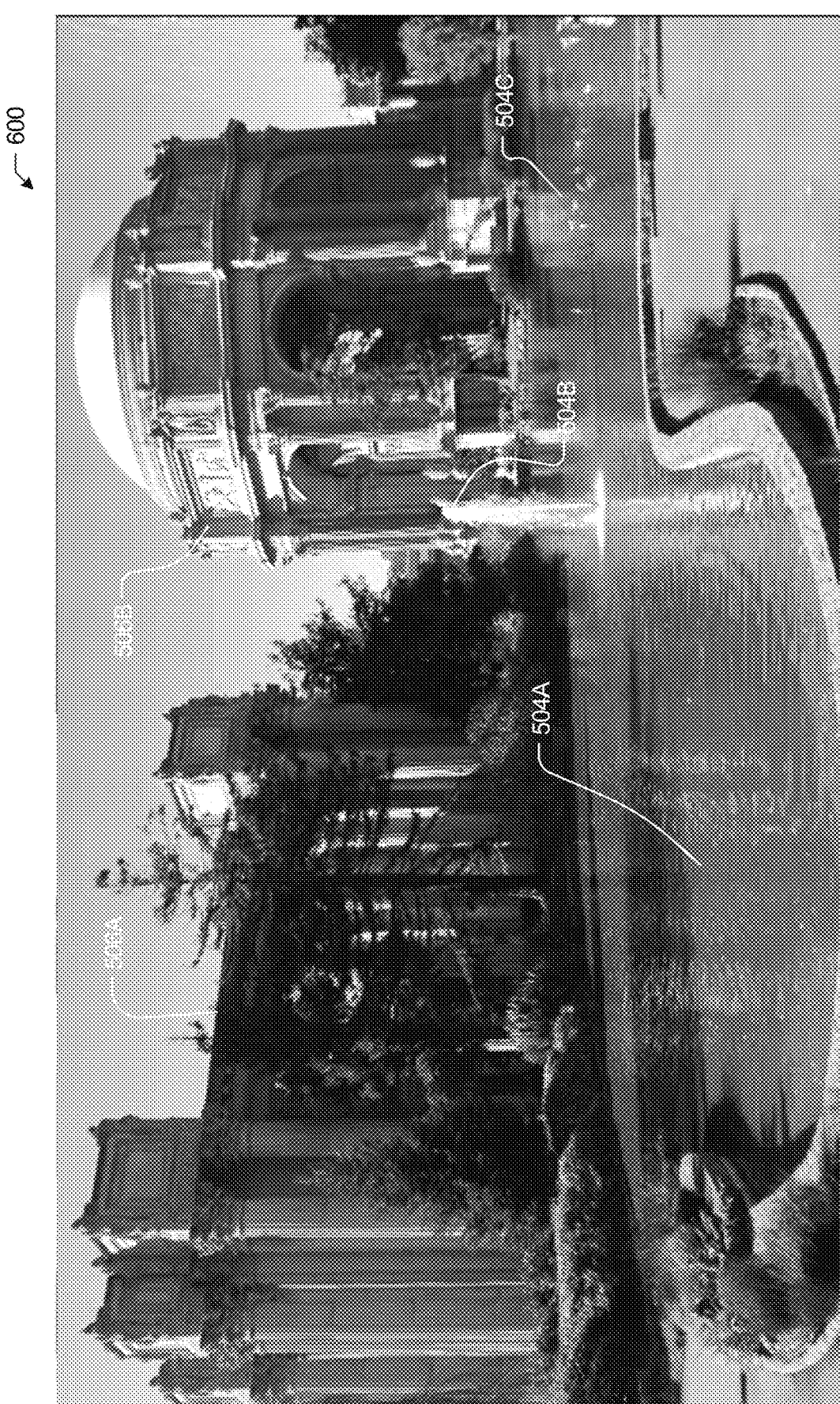
FIG. 6 depicts another final image frame.

FIG. 6 depicts a final image frame 600, illustrating another result of performing a real-time or near real-time intelligence-based editing and curating of captured images, in accordance with the presently disclosed embodiments. As depicted in the final image frame 600, the pixels corresponding to the desirable dynamic image objects 504A (e.g., water waves), 504B (e.g., water fountain), 504C (e.g., birds), and 504D (e.g., birds) and the pixels corresponding to the desirable static image objects 506A and 506B (e.g., buildings, trees) are included in the final image frame 600. Specifically, as depicted in FIG. 6, the electronic device 102 may construct the final image frame 600 by removing all of the pixels corresponding to the undesirable dynamic image objects 502A, 502B, 502C, and 502D (e.g., persons) and replacing those pixels with one or more pixels corresponding to the desirable dynamic image objects 504A (e.g., water waves), 504B (e.g., water fountain), 504C (e.g., birds), and 504D (e.g., birds) and the pixels corresponding to the desirable static image objects 506A and 506B (e.g., buildings, trees).

Figure 7:
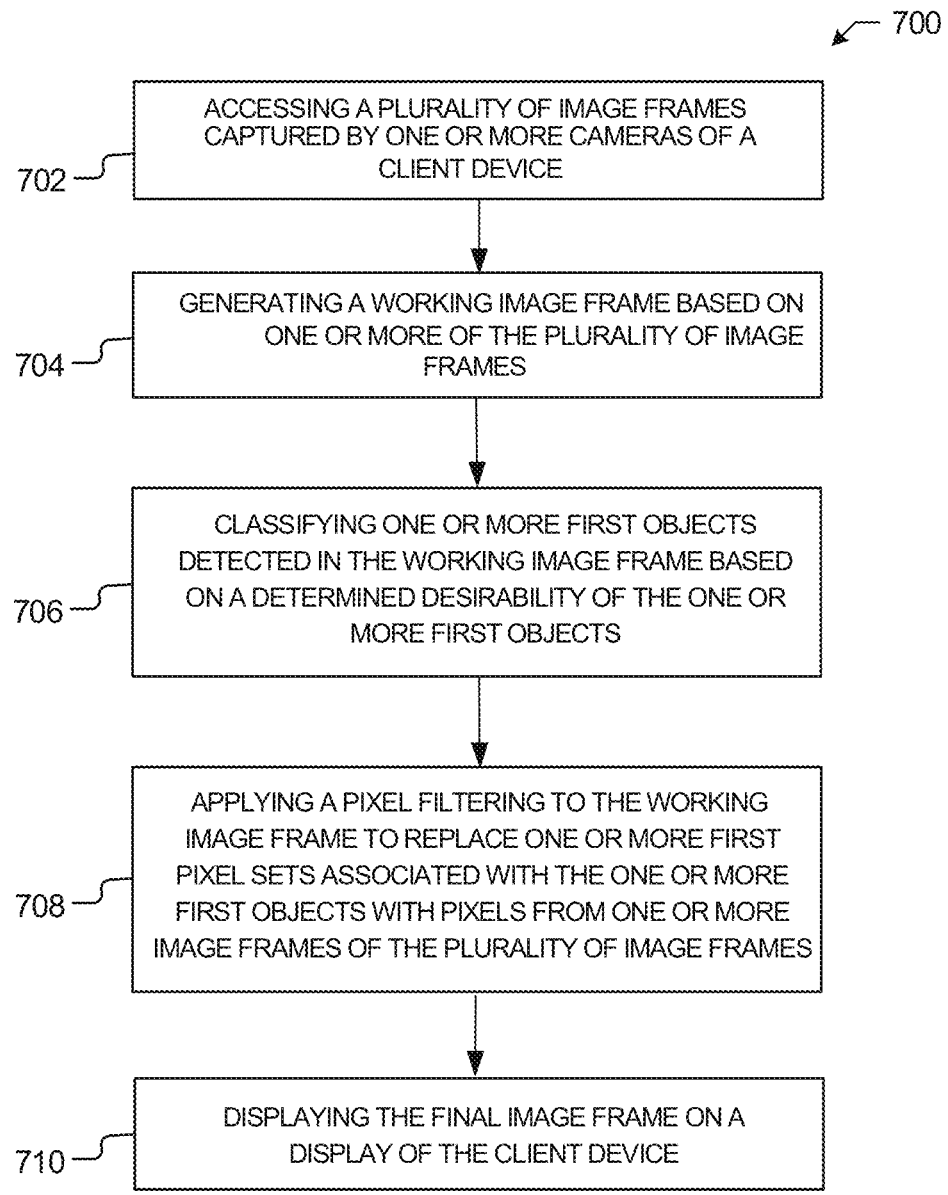
FIG. 7 illustrates is a flow diagram of a method for performing a real-time or near real-time intelligence-based editing and curating of image frames.

FIG. 7 illustrates is a flow diagram of a method 700 for performing a real-time or near real-time intelligence-based editing and curating of image frames, in accordance with the presently disclosed embodiments. The method 700 may be performed utilizing one or more processing devices (e.g., electronic device 102) that may include hardware (e.g., a general purpose processor, a graphic processing units (GPU), an application-specific integrated circuit (ASIC), a system-on-chip (SoC), a microcontroller, a field-programmable gate array (FPGA), or any other processing device(s) that may be suitable for processing image data), software (e.g., instructions running/executing on one or more processors), firmware (e.g., microcode), or some combination thereof.

The method 700 may begin block 702 with the one or more processing devices (e.g., electronic device 102) accessing a plurality of image frames captured by one or more cameras of a client device. For example, in particular embodiments, the electronic device 102 may capture in real-time or near real-time a number of images (e.g., still images, near-still images, video images, panoramic images, multi-portrait images, and so forth) and/or access a number of previously captured images that may be stored on the electronic device 102. The method 700 may then continue at block 704 with the one or more processing devices (e.g., electronic device 102) generating a working image frame based on one or more of the plurality of image frames. For example, in particular embodiments, the electronic device 102 may select a baseline image from the number of captured and/or stored images, for example, to be edited and curated.

The method 700 may then continue at block 706 with the one or more processing devices (e.g., electronic device 102) classifying one or more first objects detected in the working image frame based on a determined desirability of the one or more first objects. For example, in particular embodiments, the electronic device 102 may perform, for example, object recognition and classification to identify or classify image objects as being either dynamic image objects (e.g., persons, pets, clouds, water waves, flying flags, birds, moving vehicles, and so forth) or static image objects (e.g., buildings, signs, structures, sculptures, parked vehicles, trees, mountains, and so forth). In particular embodiments, the image objects identified or classified as being dynamic image objects may be determined to be undesirable based on, for example, one or more user inputs and/or one or more predetermined rules defined by the user 104, for example. Similarly, the image objects detected and classified as being static image objects may be determined to be desirable based on, for example, one or more user inputs and/or one or more predetermined rules defined by the user 104, for example. In other embodiments, only some of the image objects (e.g., persons, pets, moving vehicles) detected and classified as being dynamic image objects may be determined to be undesirable, while other image objects (e.g., clouds, water waves, flying flags, birds, airplanes, one or more particular persons, and so forth) detected and classified as being dynamic image objects may be determined to be desirable based on, for example, one or more predetermined rules.

The method 700 may then continue at block 708 with the one or more processing devices (e.g., electronic device 102) applying a pixel filtering process to the working image frame to replace one or more first pixel sets associated with the one or more first objects with pixels from one or more image frames of the number of images to generate a final image frame. For example, in particular embodiments, the electronic device 102 may perform, for example, one or more pixel averaging algorithms, pixel median filtering algorithms, pixel appearance filtering algorithms (e.g., pixel maximum likelihood appearance filtering algorithms), or pixel general filtering algorithms to generate a final image that includes only desirable image objects and is absent all of the undesirable image objects.

Indeed, in particular embodiments, the pixels corresponding to the static image objects and a subset of the pixels corresponding to the dynamic image objects (e.g., corresponding to only the dynamic image objects determined to be desirable) may be subject to a pixel-locking and/or sampled over a number of image frames and utilized to construct a final image by removing all but only a subset of the pixels corresponding to the dynamic image objects (e.g., the subset of pixels corresponding to the subset of dynamic image objects determined to be undesirable) and replacing those pixels with one or more pixels corresponding to the static image objects. In particular embodiments, one or more pixels corresponding to static image objects (e.g., image objects determined to be desirable, such as buildings, signs, structures, sculptures, parked vehicles, trees, mountains, and so forth) may be partially occluded by pixels corresponding to undesirable dynamic image objects. In such a case, the electronic device 102 may keep track of the corresponding pixel locations as additional images are captured and utilize sampled pixels (e.g., pixel values) from other frames corresponding to the particular locations of the partially occluded static image objects to reconstruct the partially occluded static image objects, so as to render the full and complete form of the desirable static image objects in the final image.

The method 700 may then conclude at block 710 with the one or more processing devices (e.g., electronic device 102) displaying the final image frame on a display of the client device. For example, the electronic device 102 may display via the display 108 and UI 110 a final edited and curated image generated according to the desire of the user 104 to be viewed by the user 104 and/or stored on the electronic device 102 for future viewing or user interaction. Accordingly, the present embodiments may provide an electronic device 102 and UI 110 for performing a real-time or near real-time intelligence-based editing and curating of captured image frames. In this way, the electronic device 102 may perform various intelligence-based editing and curating of captured images independently of onerous user input and supervision. Instead, the user 104, for example, may simply indicate desirability and/or undesirability for certain image objects, and as the user 104 captures or accesses images, the electronic device 102 may independently edit and curate the images to remove undesirable image objects and to emphasize desirable image objects. Furthermore, as the present techniques may allow users 104 to remove pixels corresponding to undesirable image objects of captured images and replace those pixels with pixels corresponding to only desirable image objects of the captured image (e.g., so as to render the desirable image objects in their complete form absent the undesirable image objects), the bit depth and dynamic range of the captured images may be reduced in many instances, and, by extension, the impact to memory capacity and power consumption of the electronic device 102 may also be reduced.

Figure 8:
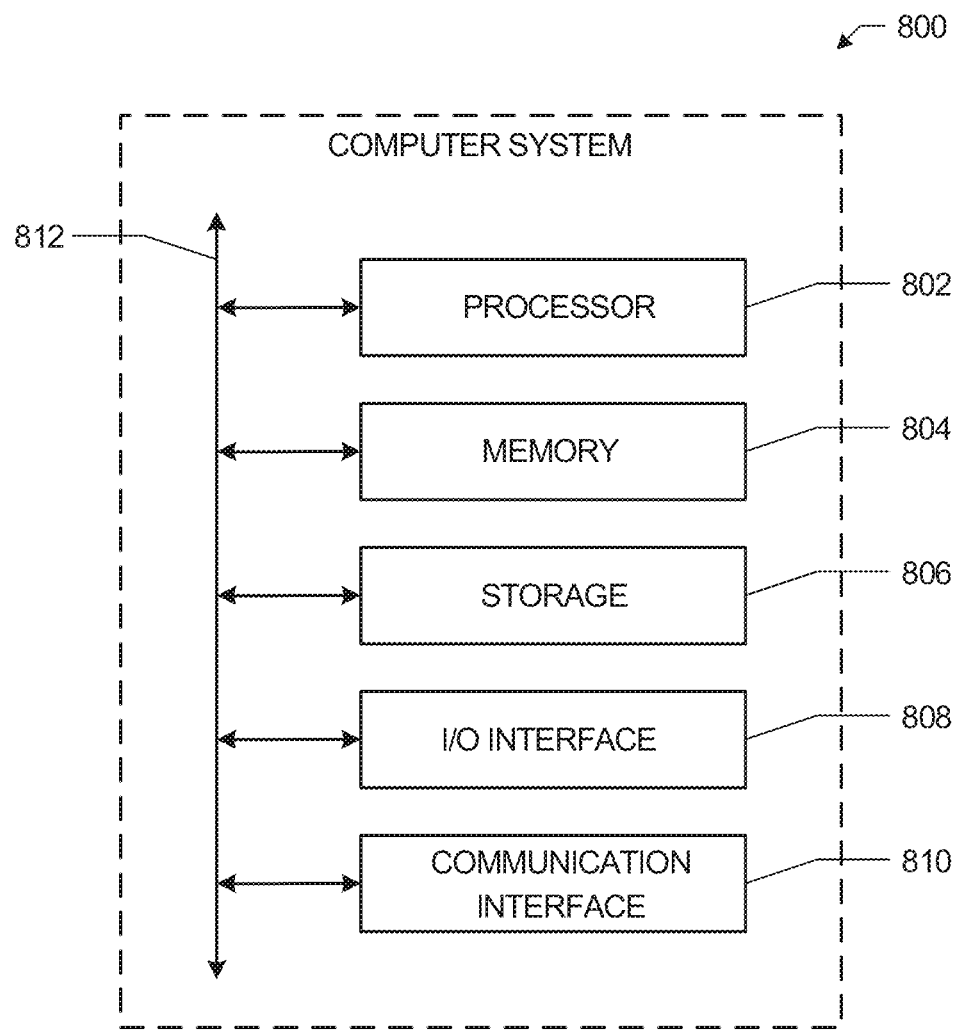
FIG. 8 illustrates an example computer system.

FIG. 8 illustrates an example computer system 800 that may be utilized to perform a real-time or near real-time intelligence-based editing and curating of captured image frames, in accordance with the presently disclosed embodiments. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks.

Where appropriate, one or more computer systems 800 may perform without substantial spatial or temporal limitation one or more steps of one or more methods described or illustrated herein. As an example, and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement. In particular embodiments, processor 802 includes hardware for executing instructions, such as those making up a computer program. As an example, and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example, and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802.

Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example, and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere).

One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memory devices 804, where appropriate. Although this disclosure describes and illustrates particular memory, this disclosure contemplates any suitable memory.

In particular embodiments, storage 806 includes mass storage for data or instructions. As an example, and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 806 for them. Where appropriate, I/O interface 808 may include one or more device or software drivers enabling processor 802 to drive one or more of these I/O devices. I/O interface 808 may include one or more I/O interfaces 806, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it.

As an example, and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example, and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 9:
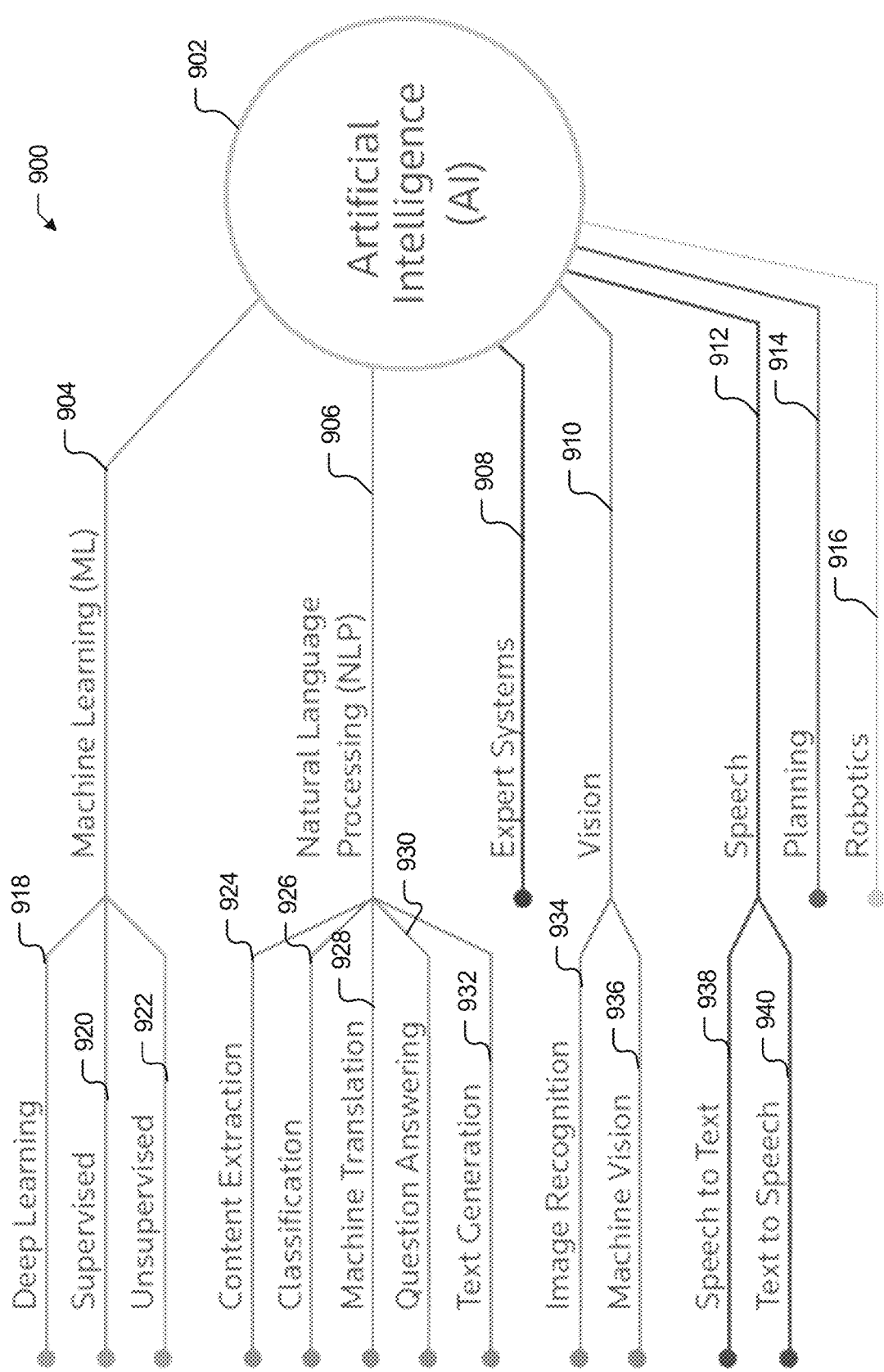
FIG. 9 illustrates a diagram of an example artificial intelligence (AI) architecture.

FIG. 9 illustrates a diagram 900 of an example artificial intelligence (AI) architecture 902 that may be utilized in performing a real-time or near real-time intelligence-based editing and curating of captured image frames, in accordance with the presently disclosed embodiments. In particular embodiments, the AI architecture 902 may be implemented utilizing, for example, one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), and/or other processing device(s) that may be suitable for processing various data and making one or more decisions based thereon), software (e.g., instructions running/executing on one or more processing devices), firmware (e.g., microcode), or some combination thereof.

In particular embodiments, as depicted by FIG. 9, the AI architecture 902 may include machine leaning (ML) algorithms and functions 904, natural language processing (NLP) algorithms and functions 906, expert systems 908, computer-based vision algorithms and functions 910, speech recognition algorithms and functions 912, planning algorithms and functions 914, and robotics algorithms and functions 916. In particular embodiments, the ML algorithms and functions 904 may include any statistics-based algorithms that may be suitable for finding patterns across large amounts of data (e.g., "Big Data" such as user click data or other user interactions, text data, image data, video data, audio data, speech data, numbers data, and so forth).

For example, in particular embodiments, the ML algorithms and functions 904 may include deep learning algorithms 918, supervised learning algorithms 920, and unsupervised learning algorithms 922. In particular embodiments, the deep learning algorithms 918 may include any artificial neural networks (ANNs) that may be utilized to learn deep levels of representations and abstractions from large amounts of data. For example, the deep learning algorithms 918 may include ANNs, such as a multilayer perceptron (MLP), an autoencoder (AE), a convolution neural network (CNN), a recurrent neural network (RNN), long short term memory (LSTM), a grated recurrent unit (GRU), a restricted Boltzmann Machine (RBM), a deep belief network (DBN), a bidirectional recurrent deep neural network (BRDNN), a generative adversarial network (GAN), and deep Q-networks, a neural autoregressive distribution estimation (NADE), an adversarial network (AN), attentional models (AM), deep reinforcement learning, and so forth.

In particular embodiments, the supervised learning algorithms 920 may include any algorithms that may be utilized to apply, for example, what has been learned in the past to new data using labeled examples for predicting future events. For example, starting from the analysis of a known training dataset, the supervised learning algorithms 920 may produce an inferred function to make predictions about the output values. The supervised learning algorithms 920 can also compare its output with the correct and intended output and find errors in order to modify the supervised learning algorithms 920 accordingly. On the other hand, the unsupervised learning algorithms 922 may include any algorithms that may applied, for example, when the data used to train the unsupervised learning algorithms 922 are neither classified or labeled. For example, the unsupervised learning algorithms 922 may study and analyze how systems may infer a function to describe a hidden structure from unlabeled data.

In particular embodiments, the NLP algorithms and functions 906 may include any algorithms or functions that may be suitable for automatically manipulating natural language, such as speech and/or text. For example, in particular embodiments, the NLP algorithms and functions 906 may include content extraction algorithms or functions 924, classification algorithms or functions 926, machine translation algorithms or functions 928, question answering (QA) algorithms or functions 930, and text generation algorithms or functions 932. In particular embodiments, the content extraction algorithms or functions 924 may include a means for extracting text or images from electronic documents (e.g., webpages, text editor documents, and so forth) to be utilized, for example, in other applications. The classification algorithms or functions 926 may include any algorithms that may utilize a supervised learning model (e.g., logistic regression, naïve Bayes, stochastic gradient descent (SGD), k-nearest neighbors, decision trees, random forests, support vector machine (SVM), and so forth) to learn from the data input to the supervised learning model and to make new observations or classifications based thereon. The machine translation algorithms or functions 928 may include any algorithms or functions that may be suitable for automatically converting source text in one language, for example, into text in another language. The QA algorithms or functions 930 may include any algorithms or functions that may be suitable for automatically answering questions posed by humans in, for example, a natural language, such as that performed by voice-controlled personal assistant devices. The text generation algorithms or functions 932 may include any algorithms or functions that may be suitable for automatically generating natural language texts.

In particular embodiments, the expert systems 908 may include any algorithms or functions that may be suitable for simulating the judgment and behavior of a human or an organization that has expert knowledge and experience in a particular field (e.g., stock trading, medicine, sports statistics, and so forth). The computer-based vision algorithms and functions 910 may include any algorithms or functions that may be suitable for automatically extracting information from images (e.g., photo images, video images). For example, the computer-based vision algorithms and functions 910 may include image recognition algorithms 934 and machine vision algorithms 936. The image recognition algorithms 934 may include any algorithms that may be suitable for automatically identifying and/or classifying objects, places, people, and so forth that may be included in, for example, one or more image frames or other displayed data. The machine vision algorithms 936 may include any algorithms that may be suitable for allowing computers to "see", or, for example, to rely on image sensors cameras with specialized optics to acquire images for processing, analyzing, and/or measuring various data characteristics for decision making purposes.

In particular embodiments, the speech recognition algorithms and functions 912 may include any algorithms or functions that may be suitable for recognizing and translating spoken language into text, such as through automatic speech recognition (ASR), computer speech recognition, speech-to-text (STT), or text-to-speech (TTS) in order for the computing to communicate via speech with one or more users, for example. In particular embodiments, the planning algorithms and functions 914 may include any algorithms or functions that may be suitable for generating a sequence of actions, in which each action may include its own set of preconditions to be satisfied before performing the action. Examples of AI planning may include classical planning, reduction to other problems, temporal planning, probabilistic planning, preference-based planning, conditional planning, and so forth. Lastly, the robotics algorithms and functions 916 may include any algorithms, functions, or systems that may enable one or more devices to replicate human behavior through, for example, motions, gestures, performance tasks, decision-making, emotions, and so forth.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a client device:
   accessing a plurality of image frames captured by one or more cameras of the client device;
   generating a working image frame based at least in part on one or more of the plurality of image frames;
   classifying one or more first objects detected in the working image frame based at least in part on a determined desirability of the one or more first objects, wherein the one or more first objects are determined to be undesirable;
   applying a pixel filtering to the working image frame to replace one or more first pixel sets associated with the one or more first objects with pixels from one or more image frames of the plurality of image frames to generate a final image frame; and
   displaying the final image frame on a display of the client device.

2. The method of claim 1, wherein classifying the one or more first objects comprises classifying the one or more first objects as dynamic objects.

3. The method of claim 2, wherein the pixel filtering comprises:
   performing a pixel-locking of the pixels from the one or more image frames of the plurality of image frames; and
   applying one or more pixel filtering algorithms on the working image frame to remove the dynamic objects.

4. The method of claim 3, wherein the pixel filtering further comprises:
   performing a pixel-locking of at least a subset of the one or more first pixel sets to preserve one or more of the dynamic objects.

5. The method of claim 1, wherein applying the pixel filtering to the working image frame comprises applying one or more of a pixel mean averaging algorithm, a pixel median filtering algorithm, a pixel appearance filtering algorithm, or a pixel general filtering algorithm.

6. The method of claim 1, wherein applying the pixel filtering to replace the one or more first pixel sets with the pixels from the one or more image frames comprises applying one or more pixel filtering algorithms to replace the one or more first pixel sets with pixels of one or more second objects determined to be at least partially occluded by the one or more first objects in the working image frame.

7. The method of claim 1, wherein the one or more first objects are determined to be undesirable based at least in part on one or more user inputs.

8. The method of claim 1, wherein the pixels from the one or more image frames of the plurality of image frames are determined to be desirable based at least in part on a predetermined rule.

9. A client device comprising:
   one or more cameras;
   a display;
   one or more non-transitory computer-readable storage media including instructions; and
   one or more processors coupled to the storage media, the one or more processors configured to execute the instructions to:
      access a plurality of image frames captured by the one or more cameras;
      generate a working image frame based at least in part on one or more of the plurality of image frames;
      classify one or more first objects detected in the working image frame based at least in part on a determined desirability of the one or more first objects, wherein the one or more first objects are determined to be undesirable;
      apply a pixel filtering to the working image frame to replace one or more first pixel sets associated with the one or more first objects with pixels from one or more image frames of the plurality of image frames to generate a final image frame; and
      display the final image frame on the display.

10. The client device of claim 9, wherein the instructions to classify the one or more first objects comprise instructions to classify the one or more first objects as dynamic objects.

11. The client device of claim 10, wherein the instructions to apply the pixel filtering to the working image frame comprise instructions to:
    perform a pixel-locking of the pixels from the one or more image frames of the plurality of image frames; and
    apply one or more pixel filtering algorithms on the working image frame to remove the dynamic objects.

12. The client device of claim 11, wherein the instructions to apply the pixel filtering to the working image frame comprise instructions to perform a pixel-locking of at least a subset of the one or more first pixel sets to preserve one or more of the dynamic objects.

13. The client device of claim 9, wherein the instructions to apply the pixel filtering to the working image frame comprise instructions to apply one or more of a pixel mean averaging algorithm, a pixel median filtering algorithm, a pixel appearance filtering algorithm, or a pixel general filtering algorithm.

14. The client device of claim 9, wherein the instructions to apply the pixel filtering to replace the one or more first pixel sets with the pixels from the one or more image frames comprise instructions to replace the one or more first pixel sets with pixels of one or more second objects determined to be at least partially occluded by the one or more first objects in the working image frame.

15. The client device of claim 9, wherein the one or more first objects are determined to be undesirable based at least in part on one or more user inputs.

16. A non-transitory computer-readable medium comprising instructions that, when executed by one or more processors of a client device, cause the one or more processors to:
   access a plurality of image frames captured by one or more cameras of the client device;
   generate a working image frame based at least in part on one or more of the plurality of image frames;
   classify one or more first objects detected in the working image frame based at least in part on a determined desirability of the one or more first objects, wherein the one or more first objects are determined to be undesirable;
   apply a pixel filtering to the working image frame to replace one or more first pixel sets associated with the one or more first objects with pixels from one or more image frames of the plurality of image frames to generate a final image frame; and
   display the final image frame on a display of the client device.

17. The non-transitory computer-readable medium of claim 16, wherein the instructions to classify the one or more first objects comprise instructions to classify the one or more first objects as dynamic objects.

18. The non-transitory computer-readable medium of claim 17, wherein the instructions to apply the pixel filtering to the working image frame comprise instructions to:
   perform a pixel-locking of the pixels from the one or more image frames of the plurality of image frames; and
   apply one or more pixel filtering algorithms on the working image frame to remove the dynamic objects.

19. The non-transitory computer-readable medium of claim 18, wherein the instructions to apply the pixel filtering to the working image frame comprise instructions to perform a pixel-locking of at least a subset of the one or more first pixel sets to preserve one or more of the dynamic objects.

20. The non-transitory computer-readable medium of claim 16, wherein the instructions to apply the pixel filtering to the working image frame comprise instructions to apply one or more of a pixel mean averaging algorithm, a pixel median filtering algorithm, a pixel appearance filtering algorithm, or a pixel general filtering algorithm.

* * * * *